United States Patent [19]

Kniebel et al.

[11] Patent Number: 4,877,117
[45] Date of Patent: Oct. 31, 1989

[54] ROTATIONAL CONTROL APPARATUS

[75] Inventors: Charles J. Kniebel, Plymouth; Virgil Schieffer, White Bear Lake; Robert C. Bredt, Minneapolis, all of Minn.

[73] Assignee: Horton Industries, Inc., Minneapolis, Minn.

[21] Appl. No.: 235,960

[22] Filed: Aug. 24, 1988

[51] Int. Cl.$^4$ .............................................. F16D 3/14
[52] U.S. Cl. ............................ 192/85 A; 192/85 AA; 192/70.13; 192/DIG. 1
[58] Field of Search ............ 192/85 A, 85 AA, 70.13, 192/70.2, 70.28, 107 R, DIG. 1

[56] References Cited

U.S. PATENT DOCUMENTS

| | | | |
|---|---|---|---|
| 1,371,391 | 3/1921 | Ollard | 192/70.28 |
| 2,259,461 | 10/1941 | Eason | 192/107 R |
| 2,369,328 | 2/1945 | Watts | . |
| 3,077,252 | 2/1963 | Treer | . |
| 3,185,256 | 5/1965 | Schilling | . |
| 3,202,252 | 8/1965 | Schilling | . |
| 3,253,687 | 5/1966 | Young | . |
| 3,409,305 | 11/1968 | Nieland | . |
| 3,762,517 | 10/1973 | Hanks | . |
| 4,226,095 | 10/1980 | Loken | . |
| 4,450,947 | 5/1984 | Hanks | 192/107 R |

Primary Examiner—Dwight G. Diehl
Assistant Examiner—Andrea Pitts
Attorney, Agent, or Firm—Peterson, Wicks, Nemer & Kamrath

[57] ABSTRACT

A rotational control apparatus in the preferred form of a fan clutch is disclosed including a friction disc portion slidably mounted and rotationally related by splines on a hub in turn rotatably mounted on a fixed shaft. The splines are formed on a radially outermost portion of the hub. A washer abuts with a shoulder formed in the hub at the intersection of a radially reduced portion with the radially outermost portion and with a retainer on the free end of the radially reduced portion sandwiches a spring in a compressed condition on the reduced portion. In an assembled relation, the friction disc portion abuts with the washer such that the spring biases the friction disc portion. The friction disc portion may be slid from the hub without removal of the hub from the shaft and with the spring retained on the hub by the washer. Both sides of the friction disc portion taper together such that the thickness therebetween decreases with the radial spacing from the rotational axis. The axial side of the friction disc portion which interfaces with the friction facing includes a first, radially straight circumferential portion extending radially into a second, radially angled, circumferential portion extending axially rearward to a third, generally radially straight, circumferential portion.

21 Claims, 1 Drawing Sheet

ROTATIONAL CONTROL APPARATUS

BACKGROUND

The present invention generally relates to rotational control apparatus, relates particularly to clutches, and relates specifically to fan clutches.

Although fan clutches of the type shown in U.S. Pat. Nos. 3,253,687; 3,409,305; 3,762,517; and 4,226,095 have proven to provide precise power, exceptional economy and dependable, long-lived durability, there exists a need to provide further improvements to result in a further advantageous clutch. Specifically, a need exists to provide easier serviceability during repair and/or maintenance. Additionally, a need exists to reduce noise and squeal resulting from operation of the clutch.

SUMMARY

The present invention solves these needs in the field of rotational control apparatus by providing, in the most preferred form of a fan clutch, an improved hub including a washer which with a retainer sandwiches a spring on a radially reduced portion of the hub, with the washer being slidable on the radially reduced portion and abutting with a shoulder defined by the interconnection of the radially reduced portion with a radially outermost portion of the hub and abutting with a friction disc portion slidably mounted on and rotationally related to the radially outermost portion of the hub. Thus, ease of serviceability results as the friction disc portion may be slid from the radially outermost portion of the hub without removal of the hub, with the spring being retained in a compressed condition on the radially reduced portion by the abutment of the washer with the shoulder.

In another aspect of the present invention, reduction of noise resulting from the clattering or hammering between the splines caused from engine vibration is obtained by placing the splines at a greater radial diameter to reduce the amount of angular movement for any given fit or tolerance and by cutting the splines finer to reduce the tolerances required for relative slidable movement between the splines.

In still another aspect of the present invention, reduction of squealing resulting from interfacing of a friction disc and facing is obtained by moving the center of the overall mass of the friction disc radially inwardly while having increased rigidity by providing a double tapering friction disc. Specifically, the axial side of the friction disc which interfaces with the friction facing includes a first, radially straight circumferential portion extending radially into a second, radially angled, circumferential portion extending axially rearward to a third, generally radially straight, circumferential portion. Further, the axial side of the friction disc opposite the friction facing is radially angled and extends axially inwardly to the periphery of the friction disc. Thus, the thickness of the friction disc between the facing engaging side and the opposite side decreases with the radial spacing from the axis to reduce mass at the outer diameter of the friction disc to reduce rotational vibration of the friction disc.

It is thus an object of the present invention to provide a novel rotational control apparatus.

It is further an object of the present invention to provide such a novel rotational control apparatus in the form of a fan clutch.

It is further an object of the present invention to provide such a novel rotational control apparatus having ease of serviceability.

It is further an object of the present invention to provide such a novel rotational control apparatus which does not require removal of the bearing hub to change the friction facing.

It is further an object of the present invention to provide such a novel rotational control apparatus having reduced noise.

It is further an object of the present invention to provide such a novel rotational control apparatus having reduced squeal.

It is further an object of the present invention to provide such a novel rotational control apparatus having reduced clatter between the splines of the bearing hub and the friction disc.

It is further an object of the present invention to provide such a novel rotational control apparatus having an improved friction disc where the center of the overall mass is moved radially inwardly.

It is further an object of the present invention to provide such a novel rotational control apparatus having an improved friction disc of increased rigidity with less overall mass.

It is further an object of the present invention to provide such a novel rotational control apparatus having a double tapering friction disc.

It is further an object of the present invention to provide such a novel rotational control apparatus designed to be simple.

It is further an object of the present invention to provide such a novel rotational control apparatus which is reliable.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
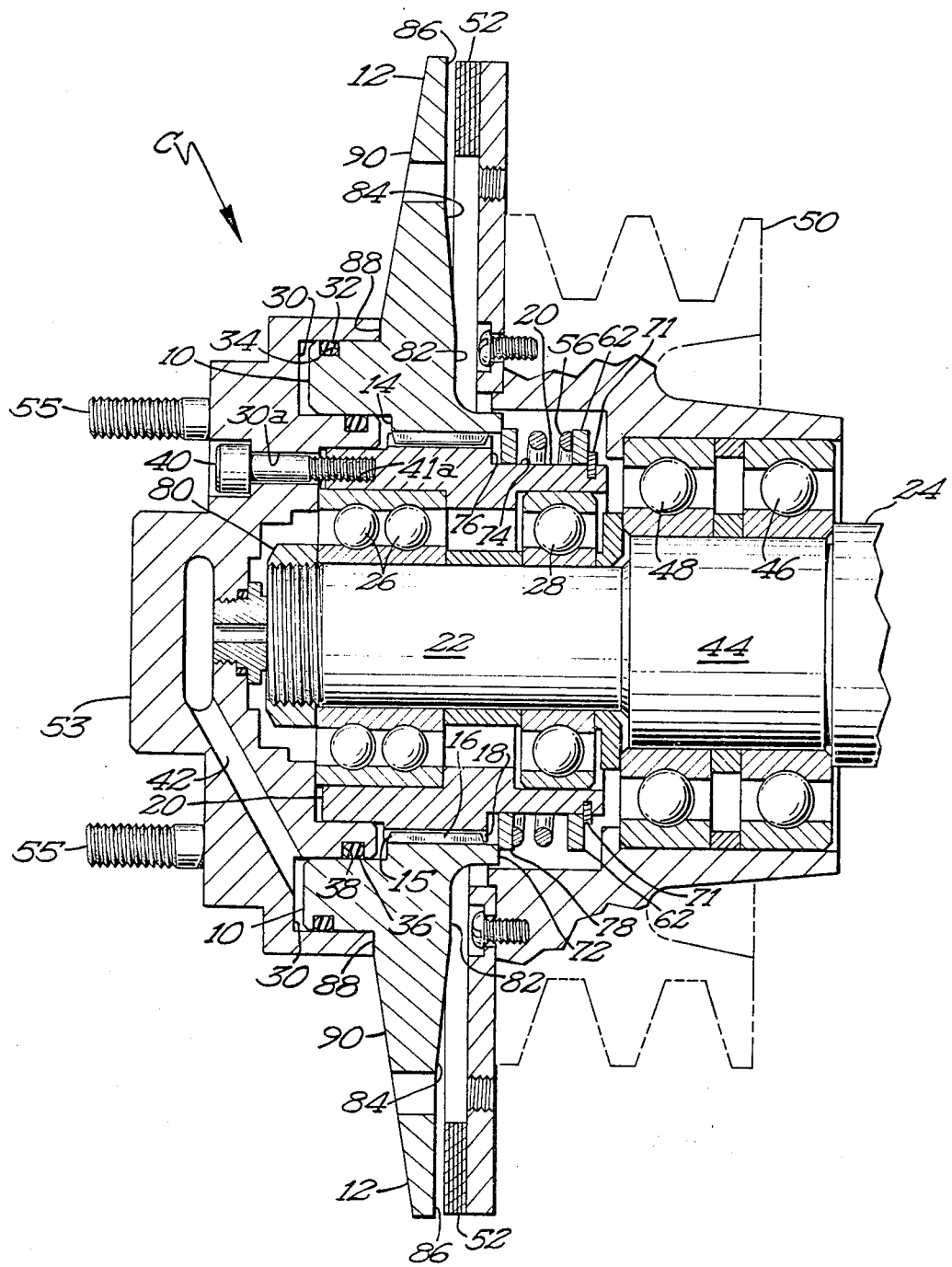
FIG. 1 shows a cross-sectional view of a rotational control apparatus in the most preferred form of a fan clutch according to the teachings of the present invention.

The FIGURE is drawn for ease of explanation of the basic teachings of the present invention only; the extensions of the FIGURE with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the FIGURE of the drawings, the same numerals designate the same or similar parts. Furthermore, when the terms "first", "second", "internal", "radial", "axial", "inward", "outward", and similar terms are used herein, it should be understood that these terms have reference only to the structure shown in the drawings as it would appear to a person viewing the drawings and are utilized only to facilitate describing the invention.

DESCRIPTION

A rotational control apparatus according to the teachings of the present invention is shown in the drawings in the preferred form of a fan clutch and is generally designated C. In the most preferred embodiment of the present invention, clutch C is an improvement of the type shown and described in U.S. Pat. No. 4,226,095. For purpose of explanation of the basic teachings of the present invention, the same numerals designate the same or similar parts in the present FIGURE and the FIGURES of U.S. Pat. No. 4,226,095. The description of the common numerals and clutch C may be found herein and in U.S. Pat. No. 4,226,095, which is hereby incorporated herein by reference.

Referring to the drawings in detail, clutch C includes a first member to be driven in the form of an annular piston 10 which has formed thereon the annular friction disc portion 12 and the internal annular base portion 14. Formed internally of the axial hole 15 of the annular base portion 14 are the torque transmitting surfaces in the form of internal splines 16 which engage with the external torque transmitting surfaces in the form of splines 18 of the hub 20. The hub 20 is rotatably mounted on the reduced outward end 22 of stationary shaft 24 by means of the bearings 26 and 28.

The numeral 30 designates an annular cylinder block in which is mounted the annular piston 10 with sealing engagement by means of the 0-ring 32 mounted in the annular groove 34 formed in the piston and the 0-ring 36 mounted in the annular groove 38 formed in the cylinder 30. The cylinder 30 is secured to the hub 20 by means of a multiplicity of spaced bolts 40 which extend through clearance holes 30a in the cylinder block 30 and engage threaded holes 41a in hub 20. Air pressure is introduced into cylinder 30 by conventional conduit means 42.

Mounted on the reduced portion 44 of the shaft 24 are the bearings 46 and 48 which rotatably mount the sheave 50 on which is mounted the friction facing ring 52. The facing 52 is engaged by the friction disc portion 12 of the piston 10 when air pressure is introduced into cylinder 30 thereby clutching in the friction disc portion 12, the hub 20 and the cylinder block 30 on which a fan (not shown) may be mounted on the pilot extension 53 and secured by means of nut-equipped studs 55 on the cylinder block 30.

Base portion 14 of the piston 10 is formed with a radially extending shoulder 72 extending outwardly beyond the radially outward extent of splines 16. Hub 20 includes a reduced portion 74 formed axially inwardly from splines 18 defining a radially extending shoulder 76 extending inwardly beyond the radially inward extent of splines 18. Further provided is the compression coil spring 56. The numerals 62 and 78 designate washers received on reduced portion 74 of hub 20 which sandwich spring 56. Washer 62 is held on the axial end of hub 20 by a locking ring or retainer 71 received in a circumferential groove formed in reduced portion 74 of hub 20. Washer 78 is received on reduced portion 74 of hub 20 and abuts with shoulder 76 of hub 20 and shoulder 72 of base portion 14.

It can then be appreciated that splines 18 are formed on the radially outermost portion of hub 20 according to the teachings of the present invention. Specifically, hub 20 according to the teachings of the present invention does not include a collar which extends radially beyond splines 18 as in clutch C of U.S. Pat. No. 4,226,095. Such larger diameter portions existing in prior clutches required that prior splines be cut on a shaper. Since splines 18 according to the teachings of the present invention are located on the radially outermost portion of hub 20, splines 18 may be cut on a hob which is faster and more economical than cutting on a shaper.

Further, it can then be appreciated that the inner diameter of splines 16 of piston 10 is larger than hub 20, piston 10 may be slid over hub 20 without obstruction. Specifically, in prior clutches including a collar extending radially beyond splines 18 of hub 20 prevented sliding of piston therebeyond. Thus, to change friction facing 52 in prior clutches, it was necessary to remove the hub including the collar in addition to removing cylinder 30 as friction disc portion 12 was unable to slide over the collar. Therefore, it was required to remove bearing nut 80 to remove the hub. The proper installation of bearing nut 80 may be critical to the clutch operation as improper installation during field repair or maintenance may result in clutch failure. Clutch C according to the teachings of the present invention does not require removal of bearing nut 80 as piston 10 may be simply slid off hub 20 without removing hub 20. Thus, it is not necessary to reinstall bearing nut 80 and problems encountered in field repair or maintenance arising from improper installation of bearing nut 80 are avoided.

It can further be appreciated that shoulder 76 according to the teachings of the present invention maintains spring 56 on hub 20 when piston 10 is removed therefrom. Specifically, washer 78 abuts with shoulder 76 to keep spring 56 in a compressed relation on hub 20 and thus retains spring 56 on hub 20 when piston 10 and cylinder block 30 is removed. It can also be appreciated that in an assembled relation, shoulder 72 of piston 10 abuts with washer 78 such that spring 56 biases piston 10 and friction disc portion 12 into a spaced relation with facing 52. Thus, even though the contact maintaining mechanism of U.S. Pat. No. 4,226,095 is not utilized in the preferred form of the present invention, clutch C according to the teachings of the present invention is believed to be advantageous for this reason, with the torsional vibration in splines 16 and 18 being controlled by other features of clutch C according to the teachings of the present invention.

According to the teachings of the present invention, splines 16 and 18 are cut finer to reduce the radial room of splines 16 and 18 and to increase the strength of base portion 14 and hub 20. Specifically, splines 16 and 18 of clutch C according to the teachings of the present invention are a 52 tooth 16/32 pitch spline and replace a 22 tooth 8/16 pitch spline previously utilized. It can then be appreciated that splines 16 and 18 may then be located at a greater radial diameter, with any increase in the radial diameter resulting in less amount of angular movement between splines 16 and 18 for any given fit or tolerance. Reduction in angular movement limits the force of hammering between splines 16 and 18. Additionally, due to the finer nature of splines 16 and 18 of clutch C according to the teachings of the present invention, the tolerances provided between splines 16 and 18 to allow sliding may be reduced. Reduction in sliding tolerances also reduces the amount of angular movement between splines 16 and 18 and thus reduces and/or eliminates the rattle and noise experienced with the splines of prior clutches by further limiting the force of hammering between splines 16 and 18. The number and pitch diameter of splines 16 and 18 of clutch C according to the teachings of the present invention when utilized as a fan clutch for a truck is believed to have synergistic results in reducing rattle and noise relative to the frequency of vibration from the truck engine.

Friction disc portion 12 in clutch C having a single interface according to the teachings of the present invention is further of an advantageous design. Specifically, friction disc portion 12 reduces vibration and minimizes squeal problems by adding overall mass and rigidity by adding mass adjacent base portion 14 and reducing mass at the outer diameter thereof utilizing a double tapering configuration.

Specifically, friction disc portion 12 is of solid construction. The facing engagement side of friction disc portion 12 includes a first, generally radially straight circumferential portion 82 which extends radially to a second, radially angled circumferential portion 84 which extends at a small angle in the range of 4° axially rearwardly to a third, generally radially straight, flat, circumferential portion 86. Portions 82 and 84 intersect at a radial extent generally equal to the radial surface of piston 10 including groove 34. Portions 84 and 86 intersect at a radial extent generally equal to the inner diameter of facing 52. Thus, when assembled, portion 86 is generally parallel to facing 52. Further, the side of friction disc portion 12 opposite facing 52 includes a first, generally radially straight circumferential portion 88 which extends radially to a second, radially angled circumferential portion 90 which extends at a small angle larger than the angle of portion 84 and in the preferred form in the range of 9° 29' axially inwardly to the peripheral edge of friction disc portion 12. Portions 88 and 90 intersect at a radial extent slightly larger than the intersection of portions 82 and 84 and in the most preferred form at a radial extent generally equal to the radial extent of annular cylinder block 30. Further, the side of friction disc portion 12 opposite facing 52 is free of air cooling fins as sufficient cooling is provided by the fan blades when clutch C is utilized as a fan clutch in its most preferred form.

According to the preferred teachings of the present invention, the cast groove provided for clearance of the screws attaching facing ring 52 when friction disc portion 12 engages facing 52 has been eliminated in clutch C. Specifically, the screws for holding the plate upon which friction facing ring 52 is secured to sheave 50 are countersunk in the plate such that the heads of the screws do not engage friction disc portion 12 when it engages friction facing ring 52. Thus, the reduction of material and mass and the resulting reduction in strength of friction disc portion 12 at the radially inward location of the screws holding friction facing ring 52 to sheave 50 created by the cast groove of the clutch as shown in U.S. Pat. No. 4,226,095 has been removed, resulting in a stronger, stiffer friction disc portion 12.

It can then be appreciated that the amount of mass contributes to vibration, with the vibration created by that mass increasing with the spacing of that mass from the rotational center of that mass. Vibrations may also be created by lack of rigidity or stiffness of the friction disc which tends to increase towards the outer periphery of the disc. Vibration in clutches may result in squeals at the interface of the friction facing and disc.

The double tapering surfaces of friction disc portion 12 of clutch C according to the teachings of the present invention provides in a cantilever beam approach the required rigidity by adding the mass radially inwardly adjacent base portion 14 and reducing the mass at the outer diameter of portion 12 where it contributes to the creation of vibrations. Further, friction disc portion 12 according to the teachings of the present invention does not rely upon integral air cooling fins to provide the necessary rigidity, which fins also increasing the rotational center of the overall friction disc. Additionally, clutch C is of a single interface variety and does not depend upon the structural support from other components such as would be present in a multiple plate interface.

Now that the basic teachings of the present invention have been explained, many extensions and variations will be obvious to one having ordinary skill in the art. For example, although clutch C is shown in its most preferred form including the friction facing ring 52 secured to a plate in turn removably secured to the member 50 which drives member 10, friction facing ring 52 may be removably secured directly to the member 50 which drives member 10 according to the teachings of the present invention.

Although clutch C has been shown in the most preferred form as including several unique features which are believed to synergistically relate together, it can be appreciated that such features may be used independently and/or in combination with other features according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In a rotational control apparatus including a friction disc portion slidably mounted on and rotationally related to a hub rotatably mounted on a shaft, with the friction disc being biased on the hub by a spring engaging a retainer on the hub, with the improvement comprising an improved hub comprising a radially outermost portion and a radially reduced portion, with a shoulder being defined by and between the radially outermost portion and the radially reduced portion, with the friction disc portion being slidably mounted on and rotationally related to the radially outermost portion of the hub; a washer slidably mounted on the radially reduced portion of the hub, with the spring being sandwiched between the washer and the retainer of the hub, with the washer abutting with the friction disc portion in the assembled apparatus and with the friction disc portion being slidable from the hub when disassembling the apparatus without requiring removal of the hub from the shaft, with the washer abutting with the shoulder of the hub for retaining the spring in a compressed condition on the hub.

2. The rotational control apparatus of claim 1 wherein the friction disc portion is slidably mounted and rotationally related to the hub by splines formed on the radially outermost portion of the hub and by splines formed in the friction disc portion.

3. The rotational control apparatus of claim 2 wherein the splines have 16/32 pitch to reduce the tolerances required between the splines to allow slidable movement to reduce the rattle and noise produced by the splines.

4. The rotational control apparatus of claim 1 wherein the friction disc portion includes an annular piston; wherein the rotational control apparatus further comprises, in combination: an annular cylinder block for receiving the annular piston, with the annular cylinder block being removably attached to the hub, with the friction disc portion being sandwiched between the washer and the annular cylinder block in the assembled apparatus.

5. The rotational control apparatus of claim 4 wherein the annular cylinder block includes means for mounting a fan, with the rotational control apparatus acting as a fan clutch.

6. The rotational control apparatus of claim 1 further comprising, in combination: a block removably attached to the hub, with the friction disc portion being sandwiched between the washer and the block in the assembled apparatus.

7. The rotational control apparatus of claim 1 wherein the friction disc portion includes a facing engaging side and a side opposite the facing engaging side, and wherein the friction disc portion comprises, in combination: a first, radially straight circumferential portion extending radially into a second, radially angled, circumferential portion extending axially rearward to a third, generally radially straight, circumferential portion, with the third circumferential portion forming the rotational interface of the friction disc portion, with the opposite side being radially angled and extending axially inwardly to the periphery of the friction disc portion, with the thickness of the friction disc portion between the facing engaging side and the opposite side decreasing with the radial spacing from the hub to reduce mass at the outer diameter of the friction disc portion to reduce rotational vibration of the friction disc portion.

8. The rotational control apparatus of claim 7 wherein the radial angle of the second circumferential portion is less than the radial angle of the opposite side.

9. The rotational control apparatus of claim 8 wherein the radial angle of the second circumferential portion is on the order of 4° and the radial angle of the opposite side is on the order of 9° 29'.

10. The rotational control apparatus of claim 9 wherein the opposite side includes a first, radially straight circumferential portion extending into a second, radially angled, circumferential portion extending axially inwardly to the periphery of the friction disc.

11. Double tapering friction disc of a solid construction for rotation about a stationary shaft, with a hub being rotatably mounted on the shaft, with the friction disc being slidably mounted on and rotationally related to the hub and including a facing engaging side and a side opposite the facing engaging side, comprising, in combination: a first, radially straight circumferential portion extending radially into a second, radially angled, circumferential portion extending axially rearward to a third, generally radially straight, circumferential portion, with the third circumferential portion forming the rotational interface of the friction disc, with the opposite side being radially angled and extending axially inwardly to the periphery of the friction disc, with the thickness of the friction disc between the facing engaging side and the opposite side decreasing with the radial spacing from the axis to reduce mass at the outer diameter of the friction disc to reduce rotational vibration of the friction disc.

12. The double tapering friction disc of claim 11 wherein the radial angle of the second circumferential portion is less than the radial angle of the opposite side.

13. The double tapering friction disc of claim 12 wherein the radial angle of the second circumferential portion is on the order of 4° and the radial angle of the opposite side is on the order of 9° 29'.

14. The double tapering friction disc of claim 12 wherein the opposite side includes a first, radially straight circumferential portion extending into a second, radially angled, circumferential portion extending axially inwardly to the periphery of the friction disc.

15. The double tapering friction disc of claim 14 wherein the intersection of the first and second circumferential portions of the facing engaging side is located radially inwardly of the intersection of the first and second circumferential portions of the opposite side.

16. The double tapering friction disc of claim 15 wherein the opposite side is free of air cooling fins.

17. The double tapering friction disc of claim 11 wherein the friction disc includes a piston portion, with the piston portion being reciprocally received in an annular cylinder block, with the annular cylinder block being removably secured to the hub.

18. The double tapering friction disc of claim 17 wherein the annular cylinder block includes means for mounting a fan.

19. The double tapering friction disc of claim 11 further comprising, in combination: a radially outermost portion and a radially reduced portion formed in the hub, with a shoulder being defined by and between the radially outermost portion and the radially reduced portion, with the friction disc being slidably mounted on and rotationally related to the radially outermost portion of the hub; a washer slidably mounted on the radially reduced portion of the hub, with the spring being sandwiched between the washer and the retainer of the hub, with the washer abutting with the friction disc portion in the assembled apparatus and with the friction disc being slidable from the hub during disassembly without requiring removal of the hub from the shaft, with the washer abutting with the shoulder of the hub for retaining the spring in a compressed condition on the hub.

20. In an apparatus including a disc slidably mounted on and rotationally related to a hub, with the disc being biased on the hub by a spring engaging a retainer on the hub, with the improvement comprising an improved hub comprising a radially outermost portion and a radially reduced portion, with a shoulder being defined by and between with the radially outermost portion and the radially reduced portion; a washer slidably mounted on the radially reduced portion of the hub, with the spring being sandwiched between the washer and the retainer of the hub, with the disc being slidably mounted on and rotationally related to the radially outermost portion of the hub and abuttable with the washer, with the washer abutting with the shoulder of the hub for retaining the spring in a compressed condition on the hub when the disc does not abut with the washer.

21. The apparatus of claim 20 wherein the disc is slidably mounted and rotationally related to the hub by splines formed on the radially outermost portion of the hub and by splines formed in the disc.

* * * * *